(12) United States Patent
Rosaen

(10) Patent No.: US 9,788,493 B2
(45) Date of Patent: Oct. 17, 2017

(54) EDGING GUIDE

(71) Applicant: Lars Rosaen, Plymouth, MI (US)

(72) Inventor: Lars Rosaen, Plymouth, MI (US)

( * ) Notice: Subject to any disclaimer, the term of this patent is extended or adjusted under 35 U.S.C. 154(b) by 0 days.

(21) Appl. No.: 13/918,546

(22) Filed: Jun. 14, 2013

(65) Prior Publication Data
US 2013/0312323 A1 Nov. 28, 2013

Related U.S. Application Data

(63) Continuation of application No. 12/027,749, filed on Feb. 7, 2008, now Pat. No. 8,464,464.

(51) Int. Cl.
*A01G 1/08* (2006.01)

(52) U.S. Cl.
CPC ...................... *A01G 1/08* (2013.01)

(58) Field of Classification Search
CPC ......... A01G 1/08; E01C 11/221; E04C 1/395; E04H 17/063
USPC ................................. 47/33; 52/102
See application file for complete search history.

(56) References Cited

U.S. PATENT DOCUMENTS

| | | | | |
|---|---|---|---|---|
| 2,551,826 A * | 5/1951 | Cox, Sr. ........................ | 52/678 |
| 3,921,356 A | 11/1975 | Hughes | |
| 4,012,159 A * | 3/1977 | Berry .............................. | 404/68 |
| 4,508,319 A | 4/1985 | Tappan et al. | |
| 4,614,070 A * | 9/1986 | Idland ............................ | 52/296 |
| 4,702,034 A | 10/1987 | Ferguson et al. | |
| 5,230,187 A | 7/1993 | Reimann et al. | |
| 5,291,708 A * | 3/1994 | Johnson ...................... | 52/282.2 |
| 5,809,700 A * | 9/1998 | Roush et al. ...................... | 52/4 |
| 5,826,372 A | 10/1998 | Parsons | |
| 5,852,895 A * | 12/1998 | Sinanan ........................... | 47/33 |
| 5,901,526 A * | 5/1999 | Vidmar et al. ............. | 52/745.09 |
| 5,913,781 A * | 6/1999 | Vidmar et al. .................. | 52/102 |
| 5,934,821 A * | 8/1999 | Shaw et al. .................... | 404/62 |
| 5,941,018 A | 8/1999 | Herrema | |
| 6,202,367 B1 * | 3/2001 | Marino et al. .................. | 52/102 |
| 7,303,358 B1 * | 12/2007 | Fuller ........................... | 405/114 |
| 7,434,360 B2 * | 10/2008 | Traub et al. .................... | 52/102 |

FOREIGN PATENT DOCUMENTS

| | | | | |
|---|---|---|---|---|
| GB | 389110 | 3/1933 | | |
| GB | 635938 | 4/1950 | | |
| JP | 2003116344 A * | 4/2003 | ............. | A01G 1/08 |
| WO | 9637659 A1 | 11/1996 | | |

* cited by examiner

*Primary Examiner* — Son T Nguyen
(74) *Attorney, Agent, or Firm* — Dinsmore & Shohl LLP

(57) ABSTRACT

An edging guide may include an anchor and a retainer that may be rotatably mounted to the anchor. The anchor may be buried in the ground during use and may include a post portion and a support portion. The retainer may be rotatably mounted to the support of the anchor and may function to secure hold one or more lengths of edging material.

14 Claims, 5 Drawing Sheets

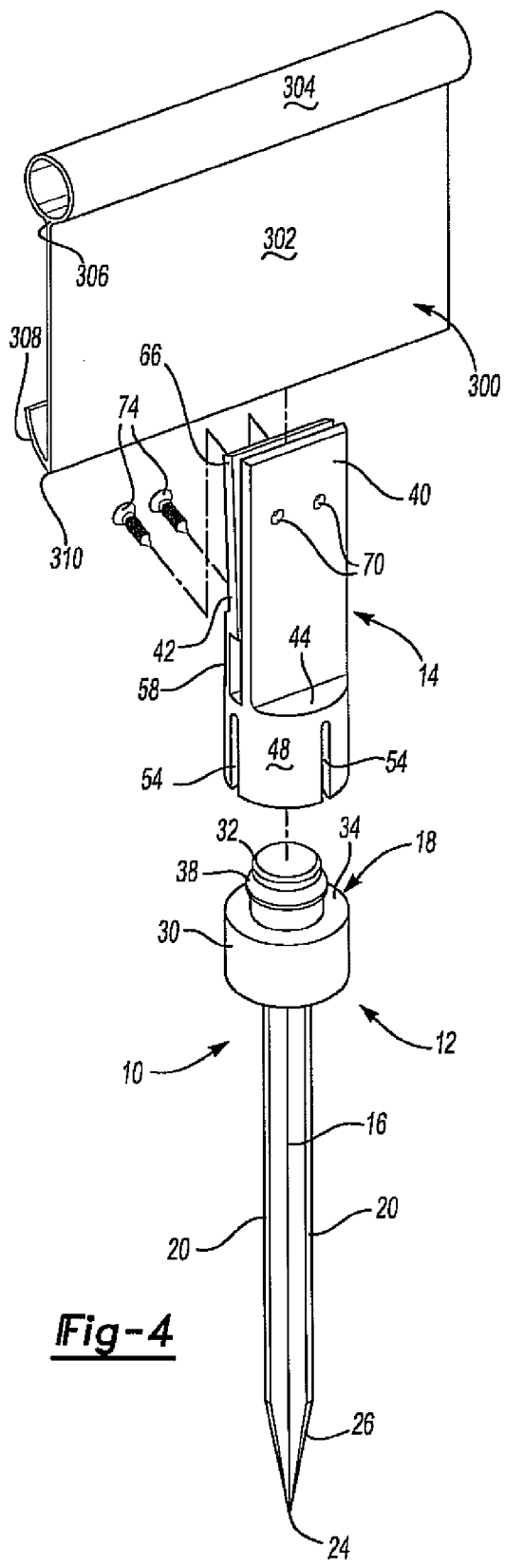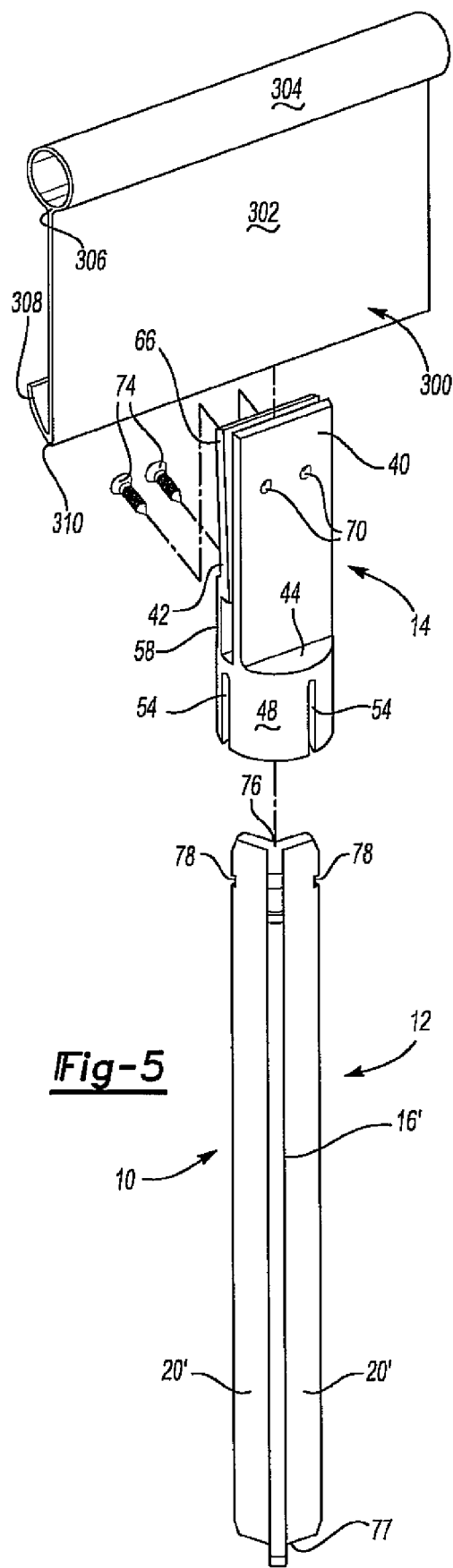

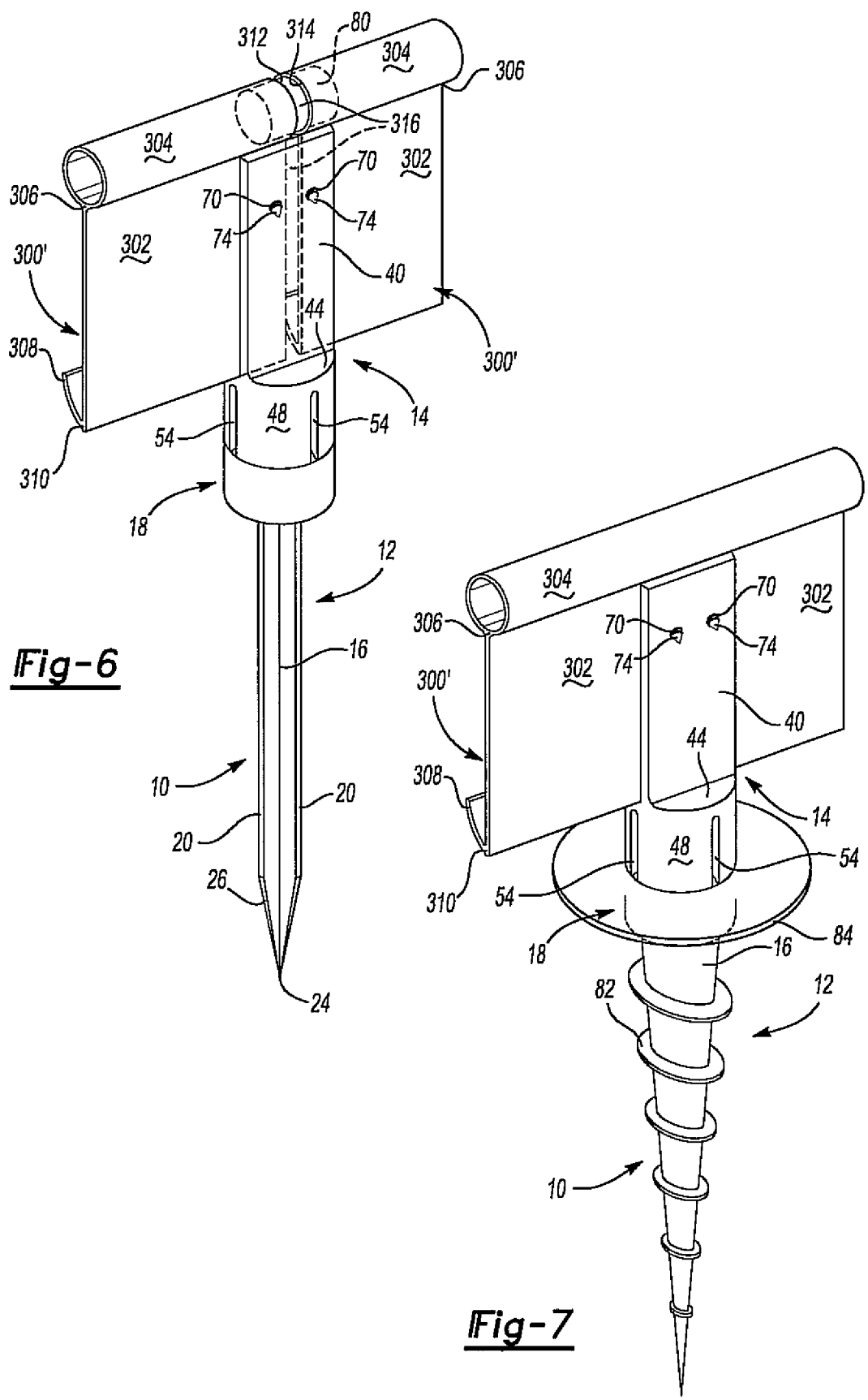

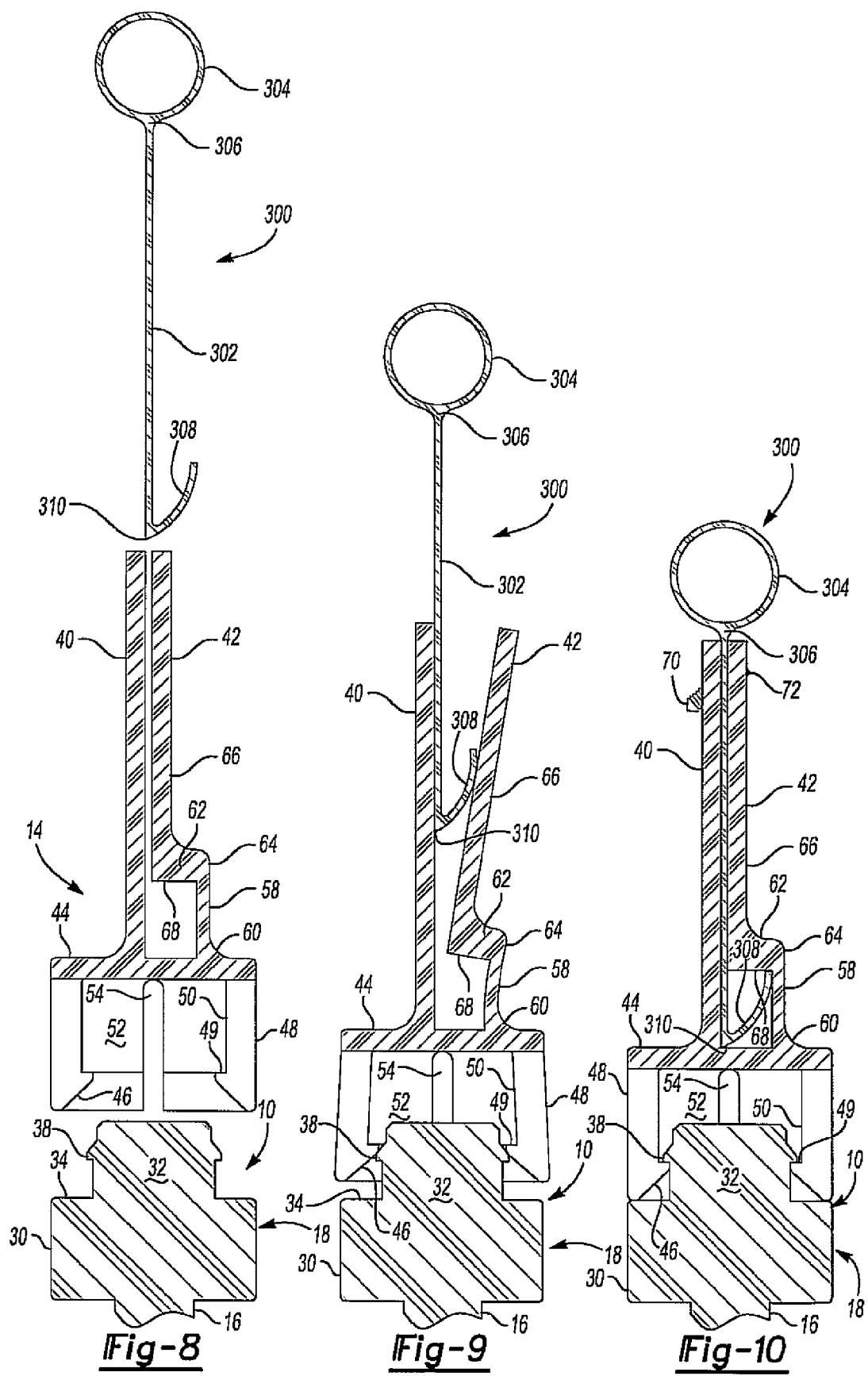

EDGING GUIDE

CROSS-REFERENCE TO RELATED APPLICATIONS

This Application is a Continuation of application Ser. No. 12/027,749 filed on Feb. 7, 2008, the contents of which are incorporated herein in its entirety.

FIELD OF THE INVENTION

Disclosed herein is an embodiment for an edging guide. More specifically, disclosed herein is a guide for use with garden edging or the like. The guide may include an anchor and a retainer. The anchor may positioned in the ground. The retainer may be rotatably positioned on the anchor and may function to retain one or more lengths of edging material.

REFERENCE TO RELATED ART

Garden edging is typically used in residential and commercial applications as a barrier between a garden bed and an adjacent bed or a lawn. Such edging may be constructed as an elongated plastic panel having a tube positioned along one edge of the panel and a hook positioned along an opposite edge. The tube may be used as a handhold during the installation process, and it is often the only part of the edging that is visible after the edging has been installed. The hook may open upwardly toward the tube of edge.

A common problem with available edging material is that, over time, pressure resulting from the heating and freezing of the ground, plus moisture from rain, will combine to slowly work the edging material out of the ground. This, of course, is a particularly undesired result given the amount of time and effort required to properly install the edging in the first place. To that end, the upwardly open hook of the edging material may be successful in delaying the dislodging of the material, but it does not prevent it.

Accordingly, there is a need for a supplemental anchoring system for an edging panel that can counter the environmental factors at work and retain the edging in position. It would also be advantageous to have an edging retainer or guide apparatus that provides the user with the ability to easily adjust the position of the edging, especially during setup.

SUMMARY OF THE INVENTION

An edging guide that may include an anchor and a retainer that may be rotatably mounted to the anchor. The anchor may be buried in the ground during use and may include a post portion and a support portion. The retainer may be rotatably mounted to the support of the anchor and function to hold one or more portions of edging material. The edging material and the edging guide may be constructed from molded plastic using known methods. However, the edging guide, or the individual components of the edging guide, and the edging itself may be constructed from various other polymers, metals (e.g., stainless steel, aluminum, or like metal) or coated metal surfaces that are resistant to rust or corrosion.

BRIEF DESCRIPTION OF THE DRAWINGS

Reference will now be had to the attached drawings, wherein like referenced numerals refer to like parts throughout, and wherein:

FIG. 4 is an exploded rear perspective view of the edging guide of FIG. 1;

FIG. 5 is an exploded rear perspective view an edging guide having an alternative embodiment of an anchor;

FIG. 6 is a rear perspective view of the edging guide shown in FIG. 1 being used to secure two separate sections of edging material to a single retainer;

FIG. 7 is a rear perspective view an edging guide having an another alternative embodiment of an anchor;

FIG. 8 is a side cutaway view of the edging retainer and a portion of the anchor wherein the edging material is arranged for insertion into the retainer;

FIG. 9 is a cutaway view of the edging retainer wherein the edging material is being inserted into the retainer; and FIG. 10 is a side cutaway view showing the edging material inserted in and secured to the retainer.

DETAILED DESCRIPTION OF THE PREFERRED EMBODIMENTS

Figure 1:
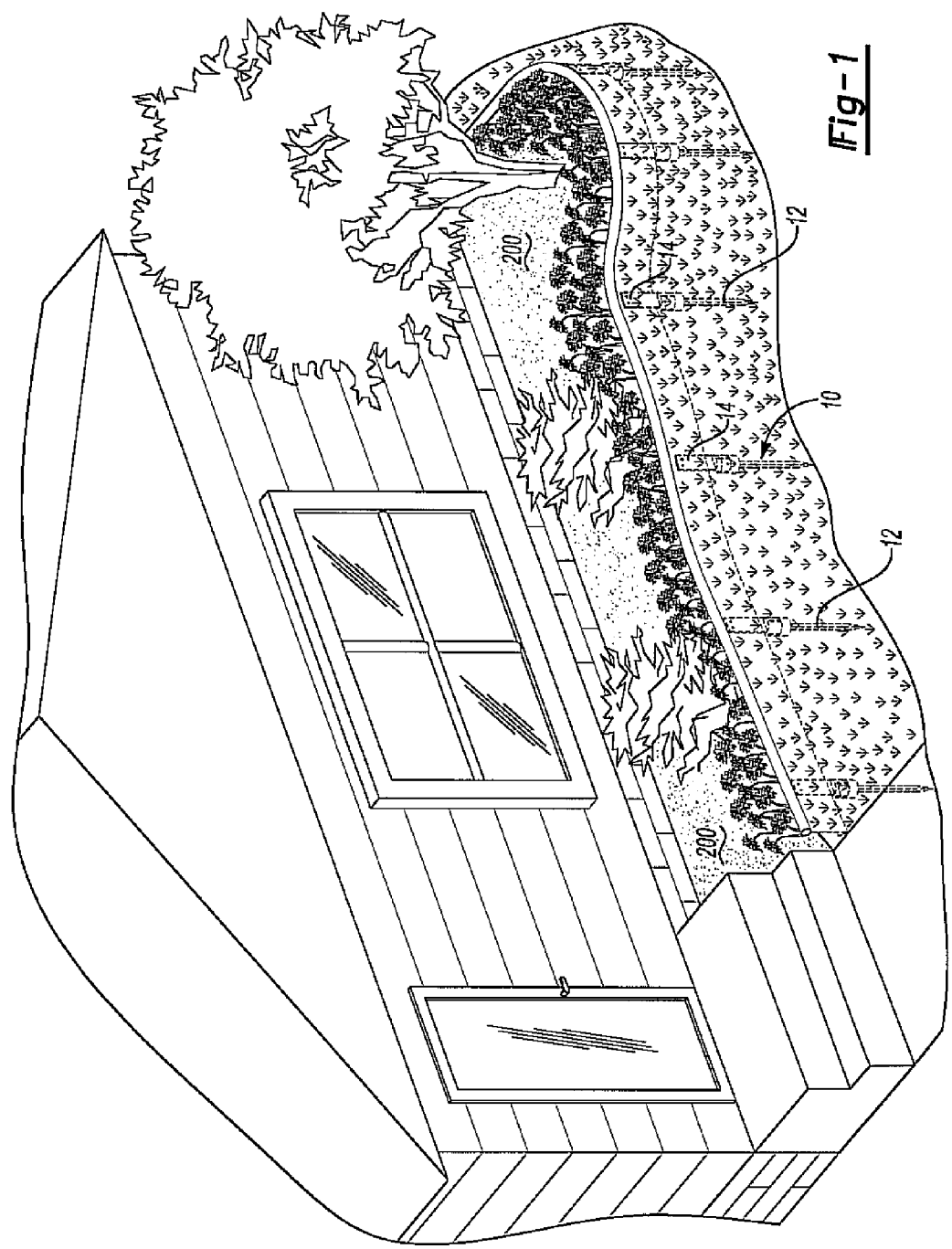
FIG. 1 is an environmental perspective view showing a plurality of edging guides retaining multiple lengths of edging material.

Referring now to FIGS. 1 through 4, an edging guide 10 may include an anchor 12 and a retainer 14. The anchor 12 may be buried in the ground 200 during use and may include a post 16 portion and a support portion 18. The retainer 14 may be rotatably mounted to the support 18 of the anchor 12 and function to hold one or more portions of edging material 300. The edging material 300 may include an elongated plastic panel 302 having a tube positioned 304 along one edge 306 of the panel 302 and a hook 308 positioned along an opposite edge 310.

The edging material 300 and the edging guide 10 may be constructed from molded plastic using known methods. However, the edging guide 10, or the individual components of the edging guide 10, and the edging material 300 may be constructed from various other polymers, metals (e.g., stainless steel, aluminum, or like metal) or coated metal surfaces that are resistant to rust or corrosion.

Still referring to FIGS. 1 through 4, the post 16 of the anchor 12 may have an X-shaped cross-section formed from four elongated flanges 20 that may extend radially from a center axis of the post 16. The flanges 20 may be tapered together to form a point 24 at one end 26 of the post 16. The support 18 may be positioned on an end of the post 16 opposite the point 24.

Still referring to FIGS. 1 through 4, the support 18 may include a base 30 with a cylindrical pin 32 that extends upwardly from the center of a top surface 34 of the support 18. A flange or lip 38 may extend concentrically around the pin 32 and, as will be described below, may be used to rotatably secure the retainer 14 to the support 18 such that the retainer 14 is simultaneously secured against separation from the support 18 in a direction parallel to a center axis of the post 16 and rotatable with respect to the support 18 of the anchor 12.

Still referring to FIGS. 1 through 4 and 8 through 10, the retainer 14 may include a base 48 and a pair of retainer plates 40, 42. The base 48 of the retainer 14 may include an upper surface 44, a bottom surface 46, and a sidewall having an exterior 48 and interior 50 surfaces. The interior surface 50 of the base 48 (or alternatively the bottom surface 46) may define a recess 52 that, as will be described below, may be fitted to the pin 32 of the support 18. To that end, the bottom surface 46 of the base 48 may be tapered upward toward the recess 52 to form a catch 49 or flange that may operate to engage the lip 38 of the pin 32. One or more grooves 54 may also extend through the sidewall to the recess 52 such that the sidewall may flex to fit over the pin 32 of the support 18.

Figure 2:
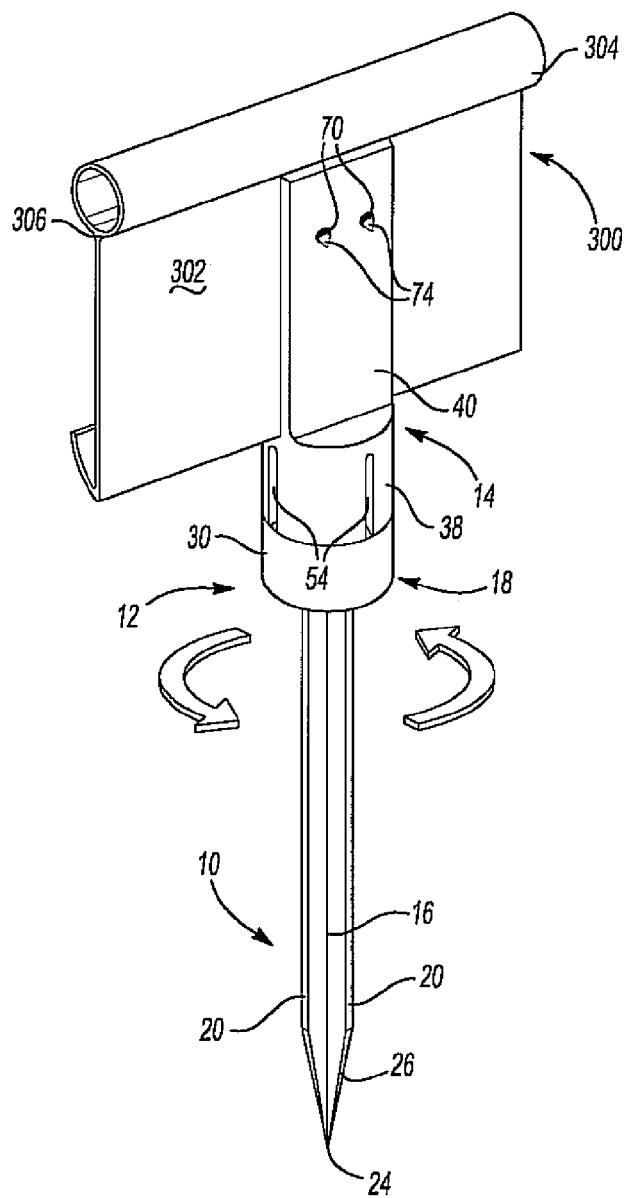
FIG. 2 is a rear perspective view of the edging guide shown in use in FIG. 1.
Figure 3:
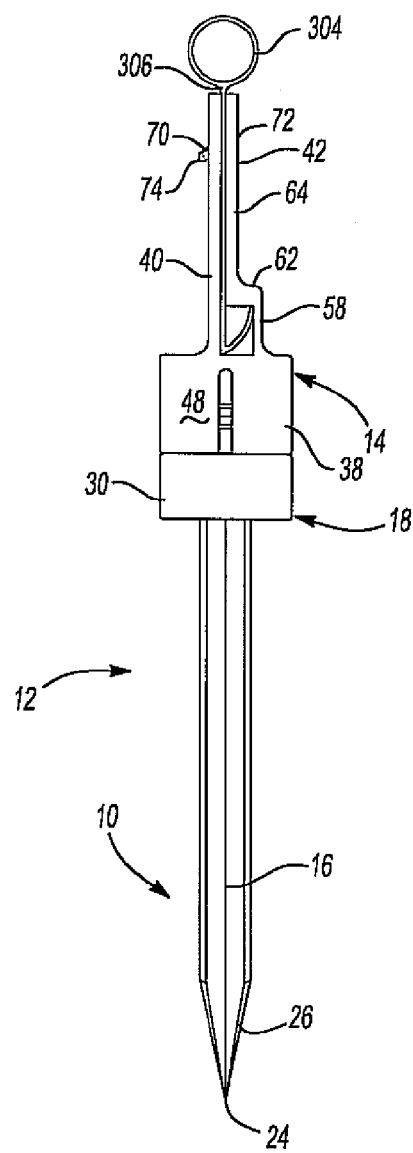
FIG. 3 is a planar side view of the edging guide shown in FIG. 1.

Referring now to FIGS. 1 through 4 and 8 through 10, the plates 40, 42 of the retainer 14 may include a first 40 and a second 42 plate. Each plate 40, 42 may be spaced a predetermined distance from the other to form a channel 66 therebetween, and may also extend substantially vertically from an upper surface 44 of the base 48 of the retainer 14. More specifically, the first plate 40 may be substantially rectangular in form and extend lengthwise from the upper surface 44 of the base 48. Further, as shown in FIG. 4, the second plate 42 may include a first portion 58 that is flexibly mounted at one end 60 to the upper surface 44 of the base 48, a generally horizontal cross-piece 62 that that extends horizontally from an opposite end 64 of the first portion 58 toward the first plate 40, and a second portion that may extend substantially vertically from the other end 68 of the cross-piece 62. Accordingly, the first portion 58 and cross-piece 62 of the second plate 42 may function to enlarge the channel 66 into an opening (as will be described below) large enough to accommodate the hook 300 of the edging material 308. As shown in FIGS. 2-3, each plate 40, 42 may also include a pair of aperture 70, 72 for use in fastening one or more lengths of edging material 300 to a retainer 14. The apertures 70 of one plate 40 may be vertically offset from those 72 of the other plate 42 such that any fasteners 74 used may be placed in a downwardly or diagonally directed orientation. It may also be appreciated that the downward orientation the fasteners 74 aids in preventing unwanted dislodging of the edging material 300 and aids installation in narrow or confined spaces.

Referring now to FIGS. 1 through 4 and to FIGS. 8 through 10, FIGS. 8-10, the retainer 14 may be press-fitting onto the support 18 of the anchor 12. Specifically, in operation, the anchor 12 may be driven or otherwise buried into the ground 200 at a desired location (e.g., a trench dug between a garden bed and a lawn). The recess 52 of the retainer 14 may then be press-fit onto the pin 32 of the support 18 such that the catch 49 of the retainer 14 may engage the lip 38 of the pin 32 and the bottom surface 46 of the retainer base 48 may rest on the top surface 34 of the support 18. Thereafter, edging material 300 may be passed though the channel 56 between the plates 40, 42 of the retainer 14 so that the hook 308 of the edging material 300 may be retained between the plates 40, 42 of the retainer.

Referring now to FIG. 5, it will be appreciated that the anchor 12 of the guide 10 may be constructed entirely as an elongated post 16'. The post 16' may have a Y-shaped or similar cross-section formed from three elongated flanges 20' that may extend radially from a center axis 22' of the post 16'. Each end 76, 77 of each flange 20' of the post 16' may be tapered to aid the user in driving the post in the ground 200. Further, each flange 20' may have a notch 78 defined in the flange 20' proximate one end 76. In operation, the notch 76 may be engaged by the catch 49 of the retainer 14 so that the retainer 14 may be rotatably mounted to the post 16'

Referring now to FIG. 6, as described above the retainer 14 may be used to secure one or more lengths of edging material 300, 300'. Specifically, the ends 312, 314 of two lengths of edging material 300, 300' may be inserted into the retainer 14 and then secured by one or more fasteners 74.

Referring now to FIG. 7, the post 16 of the anchor 12 may also included a plurality of threads 82. Further, a flange or plate 84 may extend concentrically (or radially) from the base 30 of the support 18. The plate 84 may be constructed as a separate part from the base 30, or it may be molded integral with the base 30. In operation, the threads 82 may assist a user to "screw" or "unscrew" the anchor 12 from the ground 200. The plate 84 may function to increase the amount of soil that may be place over the guide 10 when in use. It being appreciated that more soil may contribute to a greater weight/force being exerted on the guide 10 to further aid the retention of the guide 10 in the ground 200.

Having thus described carious embodiments for the edging guide, it will be understood that certain additional embodiments will become apparent to those of skill in the art that do not depart from the skill of the appended claims.

The invention claimed is:

1. An apparatus comprising:
   an anchor including a post and a support, the post having a center axis and being positionable in the ground, and the post being shaped to include a point at one end, and the support being positioned at the end of the post opposite the point and including a first nonthreaded mounting member; and
   a retainer for edging material, the retainer including a second nonthreaded mounting member and defining a channel for receiving edging material, the channel extending through the retainer between substantially opposing portions thereof, and a catch being defined on one of the first or second nonthreaded mounting member and a lip being defined on the other of the first or second nonthreaded mounting member, the lip and catch engaging each other so that the second nonthreaded mounting member engages the first nonthreaded mounting member and so that the retainer is simultaneously secured to the first nonthreaded mounting member and rotatable about the first nonthreaded mounting member and relative to the post when the post is positioned in the ground, whereby the retainer is secured against separation from the support in a direction parallel to the center axis of the post, and the retainer is rotatable about the first nonthreaded mounting member so that the channel of the retainer is alignable with a length of edging material to be received by the retainer.

2. The apparatus of claim 1, comprising a predetermined length of edging material positioned in said channel of said retainer, the edging material being constructed of at least one of a polymer or a metal.

3. The apparatus of claim 2, wherein said predetermined length of edging material comprises a panel dimensioned to be received in the channel of the retainer.

4. The apparatus of claim 3, wherein said panel of said predetermined length of edging material comprises a hook defined along one edge of said panel and said retainer is shaped to include an opening in the channel, the opening including a generally horizontal portion, and the edging material is positioned in said channel so the hook engages the generally horizontal portion and the edging material is secured against withdrawal from the retainer in a direction parallel to the center axis of the post.

5. The apparatus of claim 1, comprising at least two lengths of edging material of predetermined size positioned in said edging material receiving portion of said retainer.

6. The apparatus of claim 1, wherein the retainer comprises at least a pair of spaced apart plates, and a space between the plates defining the channel for receiving edging material.

7. The apparatus of claim 6, wherein the channel defined by the retainer includes open sides and an open top whereby a length of edging material is receivable in the retainer through at least one of the top or a side of the retainer.

8. An apparatus comprising:
   an anchor including a post and a support, the post having a center axis and being shaped to include a point at one end, and the support being positioned at an end of the post opposite the point and defining a first nonthreaded mounting member; and
   a retainer for edging material, the retainer including a second nonthreaded mounting member and defining a channel for receiving edging material, the channel extending through the retainer between substantially opposing portions thereof, and the second nonthreaded mounting member being positioned on the first nonthreaded mounting member, a catch being defined on one of the first or second nonthreaded mounting member and a lip being defined on the other of the first or second nonthreaded mounting member, the lip and catch engaging each other so that the first nonthreaded mounting member engages the second nonthreaded mounting member and so that the retainer is simultaneously secured against separation from the support in a direction parallel to the center axis of the post and rotatable with respect to the support, whereby when the post is positioned in the ground the retainer is rotatably alignable with edging material to be receivable by the retainer; and
   a length of flexible edging material of predetermined size positioned in said channel of said retainer, the length of edging material including an elongated panel and a hook, the hook engaging the retainer to secure the edging material against separation from the retainer in a direction parallel to the center axis of the post.

9. The apparatus of claim 8, wherein the retainer comprises at least a pair of spaced apart plates, and a space between the plates defining the channel for receiving edging material.

10. The apparatus of claim 8, wherein the length of flexible edging material comprises a length of flexible plastic edging material.

11. The apparatus of claim 8, where in the length of flexible edging material includes the hook, a tube and a sidewall that connects the hook and the tube.

12. A method comprising:
   providing an anchor, the anchor including a post having a center axis, being shape to include a point at one end, and a support, the support being positioned on an end of the post opposite the point and including a first nonthreaded mounting member;
   positioning at least a portion of the post of the anchor in the ground so that the support of the anchor extends above the ground;
   providing a predetermined length of flexible edging material having an pair of spaced apart ends and a hook defined along one edge;
   providing a retainer, the retainer including a second nonthreaded mounting member and defining a channel extending through the retainer between substantially opposing portions thereof with the channel having a retaining space dimensioned to receive the hook of the edging material,
   a catch being defined on one of the first or second nonthreaded mounting member and a lip being defined on the other of the first or second nonthreaded mounting member, and
   engaging the first nonthreaded mounting member with the second nonthreaded mounting member so that the catch engages the lip so that the retainer is simultaneously securable to and rotatable about the first nonthreaded mounting member and relative to the post when the post is positioned in the ground and so that the retainer is rotatably mounted to the support and secured against separation from the support in a direction parallel to the center axis of the post;
   rotating the retainer about the support and into a predetermined orientation so that the edging material is aligned with the channel of the retainer; and
   positioning the edging material in the channel of the retainer so that the hook is received in the retaining space, whereby the edging material is retained against the withdrawal of the edging material from the retainer in a direction parallel to the center axis of the post.

13. The method of claim 12, positioning the edging material in the channel of the retainer comprises positioning the material in the channel so that the material extends through the opposing portions of the retainer.

14. The apparatus of claim 12, wherein the predetermined length of flexible edging material includes the hook, a tube and a sidewall that connects the hook and the tube.

* * * * *